United States Patent [19]

Matthews et al.

[11] 4,211,302

[45] Jul. 8, 1980

[54] SOUND ABSORBING DEVICE

[76] Inventors: Carl Matthews, 102 Gloucester Rd.; Elizabeth de Recourt Martyn, 37, Stanhope Gardens, both of London, England

[21] Appl. No.: 888,871

[22] Filed: Mar. 22, 1978

Related U.S. Application Data

[63] Continuation-in-part of Ser. No. 763,547, Jan. 28, 1977, abandoned.

[30] Foreign Application Priority Data

Feb. 3, 1976 [GB] United Kingdom ............... 4258/76

[51] Int. Cl.² .............................................. F01N 1/24
[52] U.S. Cl. .................................. 181/248; 181/252; 181/258; 181/296
[58] Field of Search ............... 181/222, 224, 247, 252, 181/257, 258, 256, 284, 286, 294, 296, 227, 198, 248; 138/40, DIG. 2

[56] References Cited

U.S. PATENT DOCUMENTS

| | | | |
|---|---|---|---|
| 1,968,456 | 7/1934 | Kliejoth | 181/294 |
| 3,243,010 | 3/1966 | Flynn | 181/256 |
| 3,920,872 | 11/1975 | Ollinger | 181/284 |
| 3,954,031 | 5/1976 | Tull et al. | 181/198 |
| 3,955,643 | 5/1976 | Clark | 181/248 |

FOREIGN PATENT DOCUMENTS 2062687 6/1972 Fed. Rep. of Germany ........... 181/252
542179 12/1941 United Kingdom .

Primary Examiner—L. T. Hix
Assistant Examiner—Benjamin R. Fuller
Attorney, Agent, or Firm—Cushman, Darby & Cushman

[57] ABSTRACT

Acoustic energy is absorbed from a moving fluid by passing the fluid, which is typically a gas, through a tube of closely-woven material defining a gas passage, the tube of material being in contact with a surface covered with a multiplicity of fibers or filaments, each filament having one end attached directly or indirectly to the surface. Automobile or marine mufflers or silencers effective in reducing or eliminating objectionable noise, but with only nominal back pressure, are disclosed.

12 Claims, 2 Drawing Figures

SOUND ABSORBING DEVICE

CROSS-REFERENCE TO RELATED APPLICATIONS

This application is a continuation-in-part of our application Ser. No. 763,547 filed Jan. 28, 1977, now abandoned.

SUMMARY OF THE INVENTION

The present invention relates to the selective absorption of acoustic energy from kinetic energy under conditions of relative motion between a surface and a fluid.

More particularly the invention provides means for absorbing acoustic energy from a fluid stream, such as a gas, which is a device including a surface past which surface the fluid stream can flow, preferably with minimal loss of kinetic energy due to surface resistance. The surface is provided with a plurality of fibers or filaments of a relatively small diameter, each having one of its ends operatively attached, either directly or indirectly, to the surface and its other end extending freely adjacent to a tube of closely-woven material defining a gas passage for the fluid stream.

The present invention, in its method aspect, provides for a method of absorbing acoustic energy from a moving fluid stream, usually a gas, by passing the fluid stream over and in contact with at least one surface carrying a multiplicity of fibers or filaments of a relatively small diameter and the woven tube or liner adjacent the fluid stream, as described above.

The invention is particularly useful, for example, in providing an exhaust system or portion of the exhaust system of any desired shape or configuration for an internal combustion engine such as a motor vehicle, marine craft or aircraft, and specifically as a replacement for a conventional automotive muffler.

The present invention also includes the use of a surface having a plurality of fibers or filaments in association with a woven liner, as described above, as a portion of an air conditioning/heating duct which may be oval, square, circular or of any desired cross-sectional shape. The air passing through such a duct is able to flow with only minimal loss of kinetic energy due to surface resistance, while at the same time the flexing fibers or filaments in cooperation with the liner serve to silence or muffle the airflow.

The device of the present invention may also be useful as an integument applied to the external or internal face of a solid in order to absorb acoustic radiation from the solid.

According to one feature of the present invention the fibers are preferably flexible. A closely-woven textile like material is used as a liner to define the gas passage from the inlet to the outlet of the device, for instance an automative muffler.

The fibers may be of inorganic, metal-organic or any suitable material provided that the fibers possess physical and chemical properties appropriate for their integrity and survival for an acceptable period of use in the environment in which they are placed. Thus, for example, for endurance in an engine exhaust system of a marine craft where the exhaust gas is cooled, such as by water injection, the fibers may be of organic origin. By contrast, in the dry and uncooled conditions of the engine exhaust of an automobile, aircraft or the like, the fibers should preferably be of an inorganic material having a refractoriness and insolubility which are appropriate, and in this case could be of siliceous, ceramic, carbon or similar material. Conversely, they may be metallic, or a mixture of any one or more of the above. Selection of an appropriate fiber may be determined through preliminary experimentation by one skilled in the art. It is preferred that the average diameter of the fibers or filaments employed will be in the range of about 1 to about 50 microns in size.

The configuration of the fibers may be such that they are sufficiently close together so that their free ends are adjacent to and cooperate with the inner flexible tube which defines a substantially regular geometrical surface beyond which there is no obstruction, or relatively little obstruction, to the passage of the fluid. Furthermore, since this surface is flexible and of low reflectivity, the acoustic energy present in the fluid is readily transmitted through it and absorbed by the mass of fibers between it and the outer casing. The fibers at least initially extend normal to the surface to which their fixed ends are attached, although over a period of use may become indirectly bent or curved in the direction of the fluid flow.

DETAILED DESCRIPTION OF THE DRAWINGS

Figure 1:
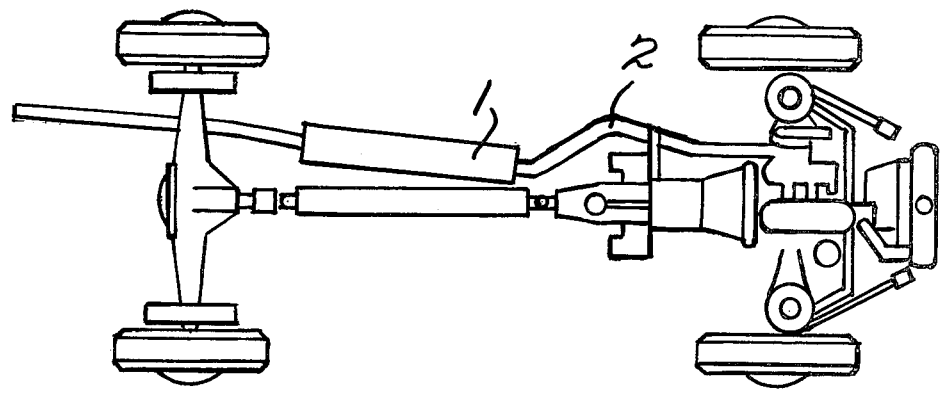
FIG. 1 is top view partial representation of an automobile showing a suggested positioning of the muffler of the present invention.

FIG. 1 depicts an automobile showing the layout of a typical muffler system. The fur invested pipe or muffler 1 (shown in more detail below) may be situated anywhere along the exhaust line 2. The muffler may, if necessary, comprise more than one invested section. Although this figure shows muffler 1 as being of greater external diameter than exhaust pipe 2, the extension of this enlargement has been (for purposes of illustration) magnified. It is important that the internal space in muffler 1 should not be less than the average diameter of the exhaust line 2. In this way no constriction is built into the exhaust line and no additional back pressure is created.

Figure 2:
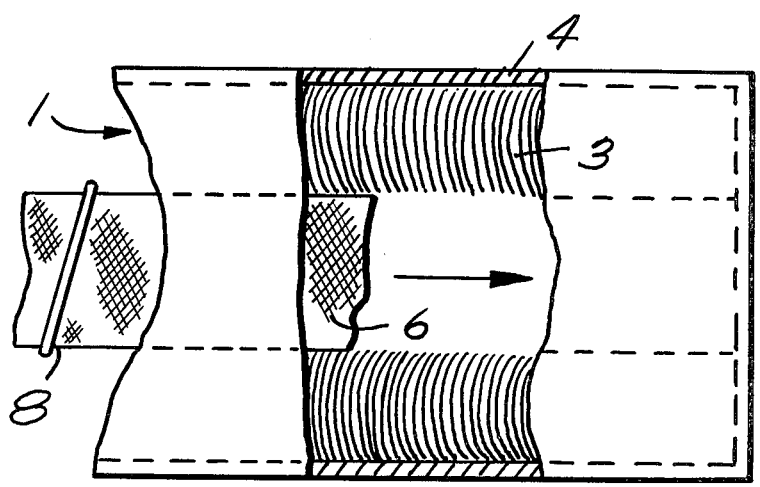
FIG. 2 is a partially broken-away cross-sectional view of an embodiment of a muffler as illustrative of the present invention.

FIG. 2 is a partially broken-away cross-sectional view of muffler 1 in which the fur investment 3 is bonded directly to wall of the muffler 4. The fiber may be bonded chemically to the wall or form an intricate part of the muffler wall 4, in which case the bonding is mechanical. A separate flexible tube or liner 6 of closely woven material through which sound may be transmitted is provided adjacent the free ends of the fur investment. A retaining device 8 such as a continuous wire spiral or the like may be provided around the outside of the flexible tube 6.

DETAILED DESCRIPTION OF THE INVENTION

In FIG. 2, the interior wall of conduit 4, shown in an axial cross-section, is provided with an investment of flexible, closely spaced fibers 3 which have a general appearance of animate fur. The free ends of the majority of the fibers, after rising from the internal wall 4 to which they are operatively attached, at least initially assume positions substantially parallel to the direction of fluid flow.

A flexible material provides a liner and defines a gas passageway from inlet to outlet. As with the fibers 3 the flexible material is selected to have both chemical and mechanical properties suitable for the environment in which it is used. A preferred material is a woven glass cloth which is capable of withstanding operational temperatures of up to at least 550° C. Also, it is preferred that the closely woven material have a thickness of less than 2 mm. It may be retained in place by suitable mechanical means and supported by a network of rigid open work materials as an open wire mesh or a spiral coil of wire. The materials selected should be woven tight enough to effectively preclude the adjacent sound absorbing material from obstructing the passage of the fluid from the inlet to the outlet of the muffler.

A muffler of the type described and illustrated is easily constructed. For example, a spiral coil of wire is wound onto a cylindrical mandrel, the diameter of which is equal to the diameter of the inlet tube of the muffler. A tightly woven glass cloth or mat of the type described is then wound onto the coil to form the central passage for gas flow, and is secured in place. The sound absorbing material is positioned about the glass mat and the whole is then inserted into the outer casing of the muffler, preferably of a cylindrical shape. The mandrel is then removed to complete the muffler.

When the construction of the present invention is used in an automobile engine exhaust system, it has been found that the acoustic energy present in the gas can be absorbed to a very high degree without incurring any substantial decrease in the kinetic energy of the gas.

This device then provides an exhaust which can be totally silent with minimal back pressure, or, at high velocities of flow, pressure of such low value that the engine maintains higher efficiency than is normally the case. This is an important feature of the present invention. A conventional automobile muffler reduces the noise made by the auto engine using a series of baffle plates, packings and walls inside of the muffler. In reducing noise a substantial amount of back pressure is created which decreases the efficiency of the engine. By reducing back pressure, the overall operating efficiency and economy of the engine are improved.

While we have not fully elaborated the theory of operation of our invention, a reasonable explanation appears to be that, that alternating compression/depression waves of acoustic energy of both longitudinal and transverse propagation are absorbed by reason of the multiplicity of phase changes and this energy is apparently transformed into heat. Also a high viscosity is provided in the closely spaced fibers by the very great number of air columns of minute diameters which interspace the filaments, such columns being a factor in the acoustic energy absorption.

Taking an automobile exhaust system as an example, it is preferred that the diameter of the flexible liner define an opening of about the same cross-sectional area as that of the bore of an incoming exhaust line. To allow the exhaust gases to flow without resistance, the minimum cross-sectional area normally required is maintained and defined by the flexible tube which is positioned in the fiber field.

The fibers may be mechanically or adhesively attached to the conduit interior surface at their roots or they may be secured to a backing layer and the backing layer fixed to the internal wall of the conduit. When so attached an adhesive will be selected to be compatible with the fibers and capable of maintaining its integrity during conditions of operation. Depending on their composition they may, for example, be deposited electrochemically, cataphoretically, or by precipitation directly on the conduit surface or on a support which is attached to the conduit surface. They may be supported, or additionally supported, at intervals by a solid keeper which exerts a retaining pressure on the investment from the fluid face, such retainer having a small cross-sectional dimension. An example of this is an arrangement of small diameter rods or a spiral of rod or wire so introduced that the rod or wire becomes substantially buried in the investment.

The keeper may even be, for example, a gauze or mesh having a very high percentage of open area. Clearly, the greater the total area of such solid and rigid keeper material which is not well buried into the investment, the less the acoustic absorbent efficiency of the investment will be.

In the event the keeper or retainer is inadvertently exposed to the sound waves present in the fluid, it is possible to arrange, in the case of the spiral rod for example, that the pitch or wave length is an aliquant of the total length of uninterrupted pipe section. An aliquot part could conceivably give rise to harmonics of certain frequencies. The leading edge of the investment may be protected from attack by the fluid or gas by insert of a short collett, usually of metal, having one end swaged.

According to the various embodiments of the devices of our invention the fibers may extend perpendicularly from the internal wall of the conduit and remain so over the whole of their length. With this arrangement, in use, the fluid flow may cause the fibers to bend over at some distance from their roots. So as to provide the optimum or most economical use of materials, a ratio will be established involving several factors such as the amount of incident energy and the statistical data relating to the fibers, population per unit area, density or specific gravity, Young's modulus, diameter, and length, particularly that part of the fiber investment which is parallel to the direction of fluid flow, effective thickness or depth from the roots when in use, environment humidity, and the length of axial path invested with the fibers.

We have, according to another aspect of our invention found that the acoustic energy present in a flowing gaseous stream can be effectively absorbed without incurring any substantial decrease in the kinetic energy of the gas by providing adjacent the flexible tube an investment to the interior wall of a muffler or exhaust system silencer casing which comprises a sound absorbing material of a mass of fibers, either oriented or randomly oriented as in the case of a felt provided that the mass contains a substantial number of fibers which extend to the surface.

The felt is obtained by conventional techniques such as needling the fiber mass leaving a multiplicity of fibrous projections on the surface. They may also be brushed or carded or blown before being installed. The fibers may be of inorganic, metal organic or organic material, but should have physical and chemical properties appropriate for their survival for a useful period in their environment. Preferably the mass of fibers is fiberglass. Thus, for use in the exhaust silencer or muffler of an internal combustion engine, the investment should have a refractoriness appropriate to these conditions. The material employed may be siliceous or metallic and a preferred material is glass fiber capable of withstanding temperatures up to at least 550° C., which temperature is typical for the exhaust system of an automobile.

The investment may be retained in position in the outer casing of the silencer by its own construction as an essentially rigid tubular member and is optionally provided with a backing layer for securing the fiber mat to the internal wall of the muffler casing. The investment may be supported by a spiral coil of wire or a rigid openwork material such as a wire mesh or gauze.

It will be appreciated that various changes and modifications of the above-described invention can be made, and to the extent that such variations incorporate the spirit of this invention, they are included within the scope of the appended claims.

We claim:

1. A device for absorbing acoustic energy from a moving fluid stream, said device comprising:
   a conduit having an interior surface,
   a plurality of flexible uni-directional, closely woven fibers operatively attached at one end thereof to said conduit interior surface the free ends of said fibers extending generally inwardly from said conduit interior, so that the free ends of said fibers define a generally regular geometrical surface, and
   a liner of closely-woven textile-like acoustically transmitting material in contact with but not secured to the free ends of said flexible fibers defining an unobstructed fluid flow passage.

2. The device as claimed in claim 1 wherein said acoustically transmitting material is woven glass fiber.

3. The device as claimed in claim 1 or 2 wherein said acoustically transmitting material has a thickness of at most about 2 mm.

4. The device as claimed in claim 1 wherein said fibers have an average diameter of 1 to 50 microns.

5. The device as claimed in claim 1 wherein both said conduit and said liner each have a circular cross-section, and wherein said geometrical surface is circular in cross-section and generally concentric with said conduit.

6. The device as claimed in claim 1 wherein said fibers comprise a fiber mat, having a plurality of free ends extending generally inwardly from said conduit.

7. An exhaust system for an internal combustion engine comprising:
   an exhaust pipe, p1 means operatively attached to said exhaust pipe for effectively absorbing the acoustic energy of fluid flowing through said exhaust pipe while allowing passage of the fluid therethrough so that negligible back pressure is provided,
   said means comprising a conduit disposed in line with said exhaust pipe, having an interior surface with a plurality of flexible, uni-directional, closely spaced fibers operatively attached at one end thereof to said conduit interior surface and having free ends of said fibers extending generally inwardly into said conduit, and a liner of closely-woven textile-like acoustically transmitting material in contact with but not secured to the free ends of said flexible fibers, so that the liner defines an unobstructed fluid flow passage of generally the same cross-sectional area as the cross-sectional area of said exhaust pipe.

8. The device as claimed in claim 7 wherein said acoustically transmitting material has a thickness of at most about 2 mm.

9. The device as claimed in claim 7 wherein said fibers have an average diameter of 1 to 50 microns.

10. The exhaust system as claimed in claim 7 wherein said internal combustion engine is a motor vehicle internal combustion engine.

11. A method of absorbing acoustic energy from a moving fluid stream comprising passing a moving fluid stream through a conduit having an interior surface, and providing a plurality of flexible uni-directional, closely woven fibers operatively attached at one end thereof to said conduit interior surface, the free ends of said fibers extending generally inwardly from said conduit interior, so that the free ends of said fibers define a generally regular geometrical surface, and providing
   a liner of closely-woven textile-like acoustically transmitting material in contact with but not secured to the free ends of said flexible fibers allowing the fibers to flex while in contact with said liner while defining an unobstructed fluid flow passage.

12. A method of absorbing acoustic energy from the exhaust sysstem of an internal combustion engine comprising providing means operatively attached to the exhaust pipe of said engine for effectively absorbing the acoustic energy of fluid flowing through said exhuast pipe and flowing fluid through said exhaust pipe while allowing passage of the fluid therethrough so that negligible back pressure is provided,
   said means comprising a conduit disposed in line with said exhaust pipe, having an interior surface with a plurality of flexible, uni-directional, closely spaced fibers operatively attached at one end thereof to said conduit interior surface and having free ends of said fibers extending generally inwardly into said conduit, and a liner of closely-woven textile-like acoustically transmitting material in contact with but not secured to the free ends of said flexible fibers so that the fibers flex and the liner defines an unobstructed fluid flow passage of generally the same cross-sectional area as the cross-sectional area of said exhaust pipe.

* * * * *